United States Patent [19]

Calvas et al.

[11] Patent Number: 4,935,863
[45] Date of Patent: Jun. 19, 1990

[54] CONTROL AND PROTECTION ASSEMBLY CONNECTING A LOCAL AREA COMMUNICATION NETWORK TO AN INDUSTRIAL PROCESS

[75] Inventors: Roland Calvas; Claude Francon, both of St. Ismier; Claude Matinal, Grenoble, all of France

[73] Assignee: Merlin Gerin, France

[21] Appl. No.: 146,024

[22] Filed: Jan. 20, 1988

[30] Foreign Application Priority Data

Jan. 26, 1987 [FR] France ................. 87 00974

[51] Int. Cl.$^5$ .............................................. G08C 19/00
[52] U.S. Cl. ........................ 364/138; 364/133; 364/474.11; 364/900
[58] Field of Search ................. 364/130–139, 364/474.11, 900 MS File, 917, 917.5, 921, 921.4

[56] References Cited

U.S. PATENT DOCUMENTS

| 4,472,783 | 9/1984 | Johnstone et al. | 364/132 |
|---|---|---|---|
| 4,517,637 | 5/1985 | Cassell | 364/138 |
| 4,628,437 | 12/1986 | Poschmann et al. | 364/138 |
| 4,628,478 | 12/1986 | Henderson, Jr. | 364/132 |
| 4,675,803 | 6/1987 | Kendall et al. | 364/131 |
| 4,707,778 | 11/1987 | Yamada et al. | 364/132 |

FOREIGN PATENT DOCUMENTS 3122109 1/1983 Fed. Rep. of Germany.

OTHER PUBLICATIONS

"Encyclopedia of Computer Science and Engineering," 2nd Ed., Van Nostrand Reinhold Co., 1983, pp. 969–973.
8130 Regelungstechnische Praxis, vol. 22 (1980), pp. 137–142.
8130 Regelungstechnische Praxis, vol. 21, No. 5 (1979-05), pp. 73–104.

Primary Examiner—John R. Lastova
Attorney, Agent, or Firm—Arnold, White & Durkee

[57] ABSTRACT

The control and protection assembly according to the invention comprises several channel units, for example a motor channel unit, a jack channel unit and an inputs-outputs channel unit, directly connected to the process to be controlled, each unit comprising a microprocessor preprogrammed so as to perform control, decentralized protection and monitoring of the associated channels. Each unit is connected to an electrical power supply system and to an internal serial network. A connecting unit acts as interface between the internal serial network and a local area communication network. The configuration and parameter setting information relevant to the process to be controlled is supplied to the various units by means of a console connected to the connecting unit.

4 Claims, 5 Drawing Sheets

CONTROL AND PROTECTION ASSEMBLY CONNECTING A LOCAL AREA COMMUNICATION NETWORK TO AN INDUSTRIAL PROCESS

BACKGROUND OF THE INVENTION

The invention relates to a control and protection assembly forming part of an automated industrial process control and monitoring system comprising at least one programmable controler whose output is connected to a local area communication network.

In the conventional manner, an automated industrial process control and monitoring system comprises at least one programmable controler connected by a local area communication network to inputs-outputs modules connected by wire-to-wire connections, generally via adaptor components, notably power circuits, to the various process actuators and sensors.

SUMMARY OF THE INVENTION

The object of the invention is to achieve a control and protection assembly interconnecting upstream to the local area communication network and directly connected downstream to the process actuators and sensors to which it also supplies the necessary electrical power.

The assembly according to the invention comprises:

a connection terminal to the local area communication network, a connection terminal to the electrical power supply system, a configuration and parameter setting input terminal designed to be connected to a console comprising a keyboard and a display device, a power supply device connected to the electrical power supply system connection terminal, a microprocessor-based connecting unit comprising a first input connected to the local area communication network connection terminal, a second input connected to the configuration and parameter setting input terminal, a third input connected to a first output of the power supply device to provide the voltage supply to the electronic circuitry of the connecting unit, the connecting unit output being connected to an internal serial network, and channel units, the outputs of a channel unit being directly connected, by wire-to-wire connections, to the process actuators and sensors associated with one or more channels of a predetermined type, each channel unit comprising an input connected to the internal serial network, a power input connected to the electrical power supply system, either directly or via the power supply device, and an input connected to the first output of the power supply device to provide the voltage supply to the electronic circuitry of the unit, each channel unit comprising a microprocessor preprogrammed so as to perform control and protection of the channels of said predetermined type which are associated with it according to the control orders transmitted to it via the local area communication network, the connecting unit and the internal serial network, and so as to transmit the information required for monitoring the channels to the local area communication network, via the connecting unit and the internal serial network.

In an assembly of this kind, the use of specialized channel units, assigned to channels of a predetermined type and containing a microprocessor preprogrammed in such a way as to perform control and protection of the channels of this type which are connected to it, enables the control and protection functions to be decentralized and standardized to a great extent. The programming of the programmable controler is consequently simplified. Furthermore, the protection functions are performed in a decentralized manner, directly at channel unit level, by the unit microprocessor. Thus, for example, motor thermol protection is performed by the corresponding motor channel unit and not, as in the prior art, by the programmable controler and by means of a specialized device. This decentralization enables failures to be dealt with more quickly and in a more appropriate manner, independent from the control sequence being run by the programmable controler. The channel units also comprise an overvoltage and/or overcurrent selfprotection device; they are achieved by devices specific to each channel unit; thus, to give an example, for the motor channel unit the device is electromechanical. It should be noted that the assembly does not monitor the process itself, but sends the necessary information to a higher hierarchical level via the local area network.

The use of an internal serial network to connect the various channel units to a connecting unit, itself connected to the local area communication network and to a console designed for conversation, at the assembly level, with an operator, enables the number of connecting wires inside the assembly to be limited and maintenance to be carried out quickly by replacing the channel units.

The assembly is preferably manufactured in the form of a modular enclosure, thus making it possible to achieve an assembly adapted to suit the application involved using a certain, limited, number of standard modules.

An assembly according to the invention, which constitutes a single interface between the local area network and the sensors and actuators, is very easy to use for the user who only has to connect it by means of wire-to-wire connections to the sensors and actuators, and by means of three connection terminals to the electrical power supply system, the console, and the local area communication network.

The console enables the configuration and parameter setting data, which are stored in the assembly according to the invention, to be modified locally, this data naturally also being able to be modified via the local area communication network.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
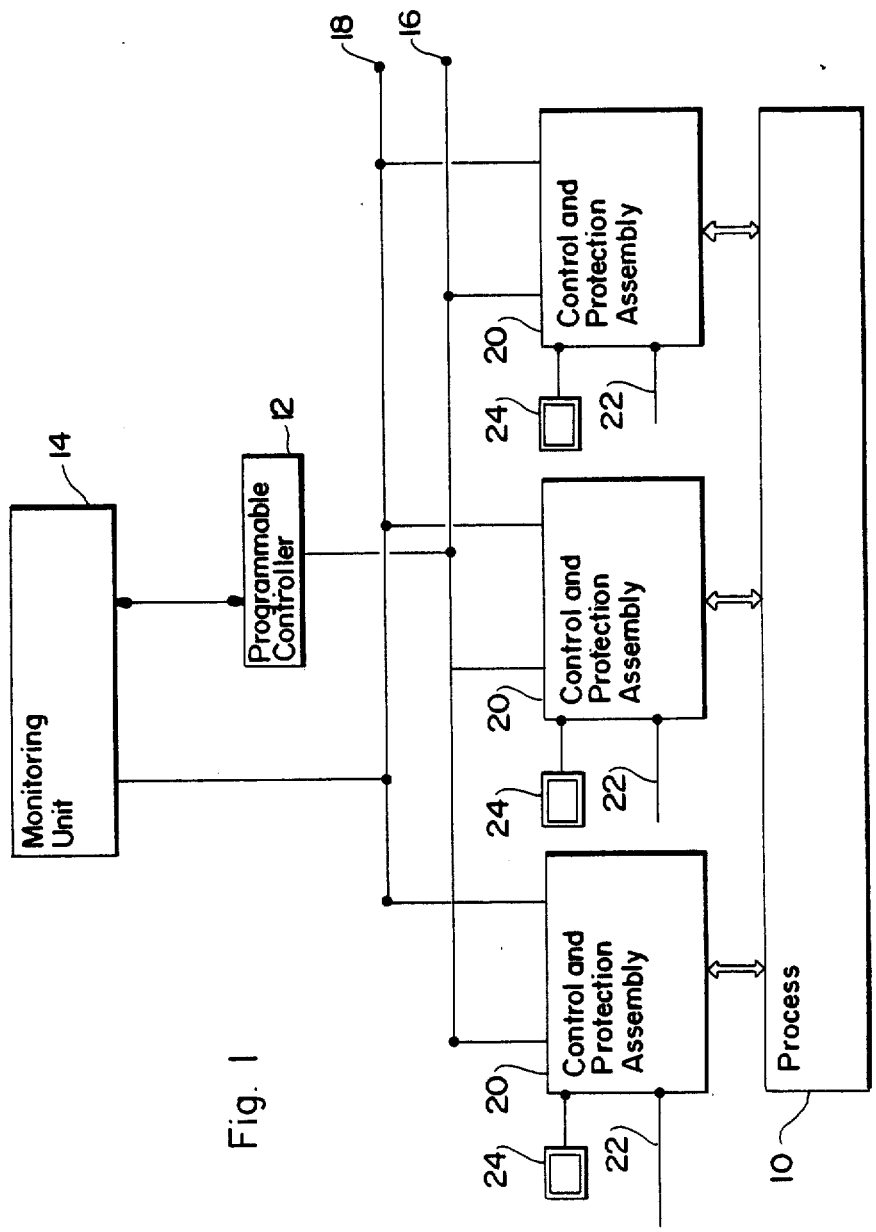
FIG. 1 represents a simplified block diagram of an industrial process control and monitoring system using control and protection assemblies according to the invention.

FIG. 1 illustrates in block diagram form an automated control and monitoring system of an industrial process 10. A process of this kind comprises various actuators (not shown), such as electric motors, jacks controled by electro-pneumatic or electro-hydraulic distributors, etc, and various sensors, switches, etc, (not represented) designed to detect the process status and conditions.

The process 10 is placed under the control of a programmable controler 12, itself connected to a monitoring unit 14.

In the preferred embodiment represented in the figure, the output of the programmable controler 12 is connected to a local area communication network 16, constituting a field network, whereas the output of the monitoring unit 14 is connected to a local area communication network 18, constituting a monitoring network, distinct from the field network. These networks constitute bidirectional links, as do all the internal electronic connections mentioned hereinafter.

The system comprises several control and protection assemblies 20 according to the invention, each assembly 20 being connected upstream to the two local area communication networks 16 and 18, and downstream directly to the actuators and sensors of the process 10.

Each assembly 20 is furthermore connected to an electrical power supply system 22 and to a console 24 which is associated with it, this console being for example a standard terminal comprising a keyboard and a display device.

The programmable controler 12 therefore monitors the sequential operation of the process 10 through the local area network 16 and the assemblies 20.

Although in the preferred embodiment represented in the figure, the assemblies 20 are connected to two distinct networks, 16 and 18, a single local area communication network can be used providing the link between the programmable controler 12 and the process control assemblies, without departing from the spirit of the invention, the data exchanges between the process and the monitoring unit 14 then taking place via the programmable controler 12.

These two networks will nevertheless preferably be distinct, as represented in FIG. 1, the protection functions not being performed at the programmable controler level, but fully decentralized in the assemblies 20, the monitoring unit 14 receiving the information necessary for centralized system monitoring directly from the assemblies 20, via the monitoring network 18. This physical separation of the field and monitoring networks is a desirable feature, for, the two networks both have to transmit messages of different types, and have to work at different transmission rates, and finally the destination of the messages (programmable controler or monitoring unit) is different. Thus, for example, the field network transmission rate is faster than the monitoring network transmission rate, whereas the messages transmitted by the monitoring network are more complex, possibly even messages in clear language indicating a failure, than the messages transmitted on the field network by the programmable controler, which are for example motor start-up or stop, or jack opening or closing orders.

Figure 2:
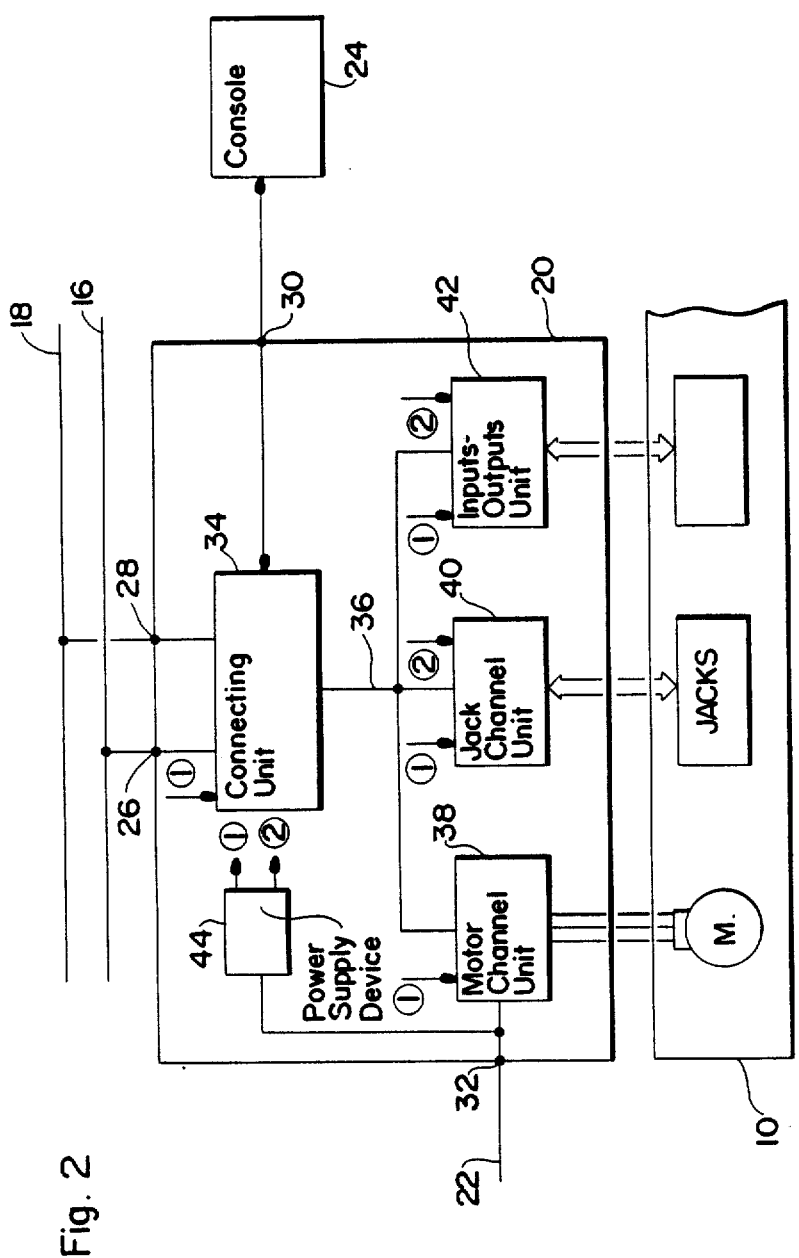
FIG. 2 represents a block diagram of a control and protection assembly according to the invention.

The block diagram in FIG. 2 represents a control and protection assembly 20 according to the invention. This assembly is connected by connection terminals 26 and 28 respectively to the control network 16 and monitoring network 18, by a configuration and parameter setting input terminal 30 to the associated console 24, by a connection terminal 32 to the electrical power supply system 22 and by connection terminals (not shown) to the various component parts, actuators and sensors, of the process 10.

The assembly 20 comprises a connecting unit 34 connected by an internal serial network 36 to various independent specialized units, which will hereafter be called channel units in the description.

In FIG. 2, three channel units are represented, to give an example, a motor channel control and protection unit 38, a jack channel control and protection unit 40 and an independent inputs-outputs unit 42. It is quite obvious that the invention is limited neither to this number of channel units, nor to this type of channel units. As far as their number is concerned, this will in practice be fixed by the respective dimensions of the various components, a control and protection unit 20 being manufactured in modular form, so as to be able to be fitted on standardized DIN rails in a standard 19-inch enclosure.

A channel unit is assigned to control and protection, or monitoring of one or more channels, a channel being a set of actuators or sensors closely linked together by relationships which are independent from the automation application.

To give an example, a jack channel comprises the jack control electrodistributor and the associated end-of-travel sensors, a motor channel comprising the static contactor controling the motor, the current sensors, protection system signalling contacts, etc.

A channel unit controls a single channel, in the case of a motor, or several channels of the same kind. Thus, in a preferred embodiment, a jack channel unit performs control and protection of a maximum of eight jacks.

Similarly, an inputs-outputs unit, for example binary inputs-outputs, performs monitoring of sixteen channels, i.e. a maximum of sixteen independent inputs and-/or outputs.

The structure and operation of a motor channel unit, a jack channel unit and an inputs-outputs unit will be explained in greater detail further on, with reference to FIGS. 4 to 6.

The channel unit type is adapted to suit the process to be monitored, and can, to give an example, comprise in addition a speed control interface channel unit, a regulator interface channel unit, an analog inputs-outputs unit, a spindle control channel unit, etc.

Each channel unit comprises a microprocessor, preprogrammed according to the type of channels it monitors, in such a way as to manage the control and protection of these channels. Thus, whereas the control sequence of a channel, a jack channel for instance, was hitherto usually programmed at the programmable controler level, a jack channel unit according to the invention, specially designed for jack control, includes a set specialized program, the unit being able to receive configuration and parameter setting data from the console 24, via the connecting unit 34, enabling monitoring to be adapted to the type of jack used. Thus, a jack opening order sent by the programmable controler 12 will be transmitted by the connecting unit 34 and by the internal serial network 36 to the jack channel unit 40 controlling the jack involved, and the opening control and monitoring sequence of this jack will be carried out, in decentralized manner, by the specialized channel unit involved.

The assembly 20 also comprises a power supply device 44 connected by the terminal 32 to the electrical power supply system 22. This device provides a voltage, for example 5 V, on an output 1 designed to supply all the electronic circuitry of the assembly, and on an output 2 the power supply voltage required for the various channel units, except for the motor channel units, which are directly connected to the power supply system 22. As an example, the power supply system 22 provides a three-phase supply voltage of 380 V, whereas the voltage available on the output 2 of the power supply device 44 is for example a voltage of 24 V or 48 V, D.C. or A.C., the power required on a jack channel being for example in the order of a few watts.

Figure 3:
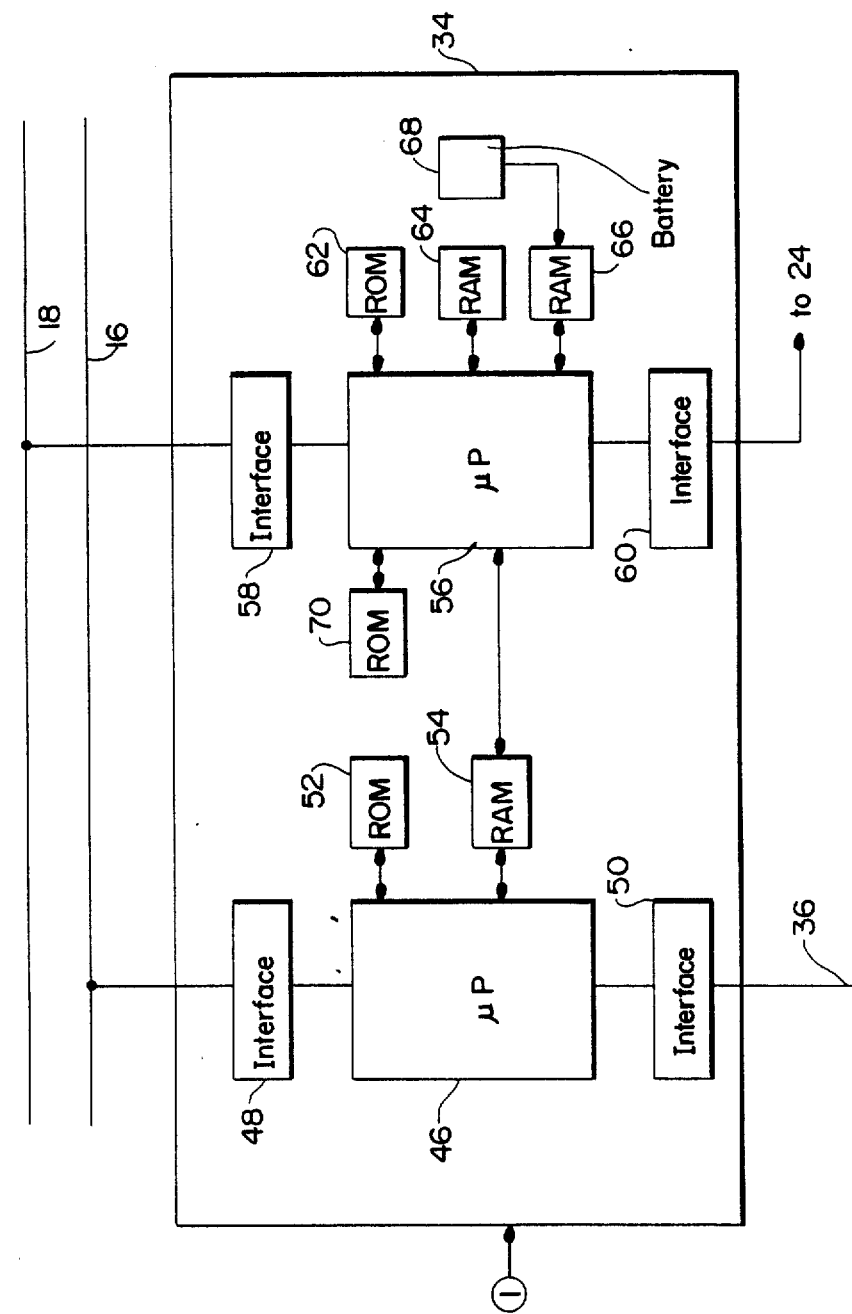
FIGS. 3 to 6 represent, in block diagram form, respectively a connecting unit, a motor channel control and protection unit, a jack channel control and protection unit, and an input-output unit, belonging to an assembly according to the invention.

The connecting unit 34 is represented in greater detail in FIG. 3. It provides the link between the field and monitoring networks, the internal serial network 36 and the console 24.

In the preferred embodiment represented in FIG. 3, the connecting unit comprises two microprocessors. The first microprocessor 46 is connected by an interface 48 to the field network 16 and by an interface 50 to the internal serial network 36. The microprocessor comprises all the usual microprocessor resources and is in particular associated with a read-only memory (ROM) 52 and a random access memory (RAM) 54, for management of the field network 16 and the internal serial network 36. The second microprocessor 56 is, for its part, connected by an interface 58 to the monitoring network and by an interface 60 to the console 24. It also comprises all the usual microprocessor resources and is associated with a first read-only memory (ROM) 62, a first random access memory (RAM) 64, a second random access memory (RAM) 66, or parameter memory, connected to a battery 68, and a second read-only memory (ROM) 70 acting as a dictionary. The parameter memory 66 may be an EEPROM memory. The second microprocessor 56 also has access directly to the random access memory (RAM) 54 of the first microprocessor, thus enabling data exchanges between the two microprocessors. In this way, the second microprocessor 56 manages the monitoring network and the conversation with the operator via the console 24, enables data to be exchanged, via the memory 54 and the first microprocessor, between these networks and the internal network 36, and stores the parameters in the memory 66 in case a power supply outage occurs. The read-only memory 70 is a so-called dictionary memory, containing all the elements required to generate messages in clear language on the monitoring network and, possibly, on the field network.

The supply voltage (5 V) required for operation of the various component elements of the connecting unit 34 is supplied by the output 1 of the power supply device 44. The internal connections have been omitted in order to avoid overloading the figure unnecessarily.

The connecting unit acts as switching and protocol conversion device between the different networks connected to it. It does not have any effect on the sequential running of the process which remains fixed by the programmable controler. The interfaces 48 and 58, contain not only the necessary physical junctions, but also the protocols corresponding to those used on the associated network. A simple change of interface using a different protocol thus enables the assembly 20 to operate with a field and/or monitoring network using a different access protocol. This is not, however, necessary as far as the interface 50 connected to the internal serial network is concerned, the latter using a protocol defined once and for all, nor as far as the interface 60 connected to the console is concerned, as this type of peripheral equipment uses a standardized protocol.

When the assembly 20 is first powered on, the operator enters, by means of the console 24, configuration and parameter setting data which is stored in the parameter memory 66. This data is then transmitted, via the microprocessors 56 and 46, the random access memory 54 and the interface 50, to the internal serial network to be conveyed to the different channel units. The data relating to a channel unit is then stored in this unit, certain data also being able to be stored in the memory 54.

If a current outage occurs, the parameters are only kept in the backed-up memory 66, which will therefore be able to supply them again to the various channel units when the power supply returns. In order to accelerate the exchanges between the internal serial network 36 and the field network, certain data stored in the dictionary memory 70 are entered in the random access memory 54 which provides a link between the two microprocessors.

The values of the parameters contained in the memory 66 can be modified at any time, either locally via the console 24, or remotely through the local area communication network via the monitoring unit.

As the exchanges between the field network 16 and the internal network 36 are more frequent and quicker than between the internal network and the monitoring network 18 or the console 24, the preferred embodiment of the connecting unit 34 comprises, as shown in the figure, two microprocessors one of which manages the field network and internal network. A single microprocessor can however be used to perform the functions of these two microprocessors, without departing from the spirit of the invention. It should be noted that the assembly 20 can operate without being connected to the field and monitoring networks, by means of the manual controls accessible on the keyboard of the console 24.

Figure 4:
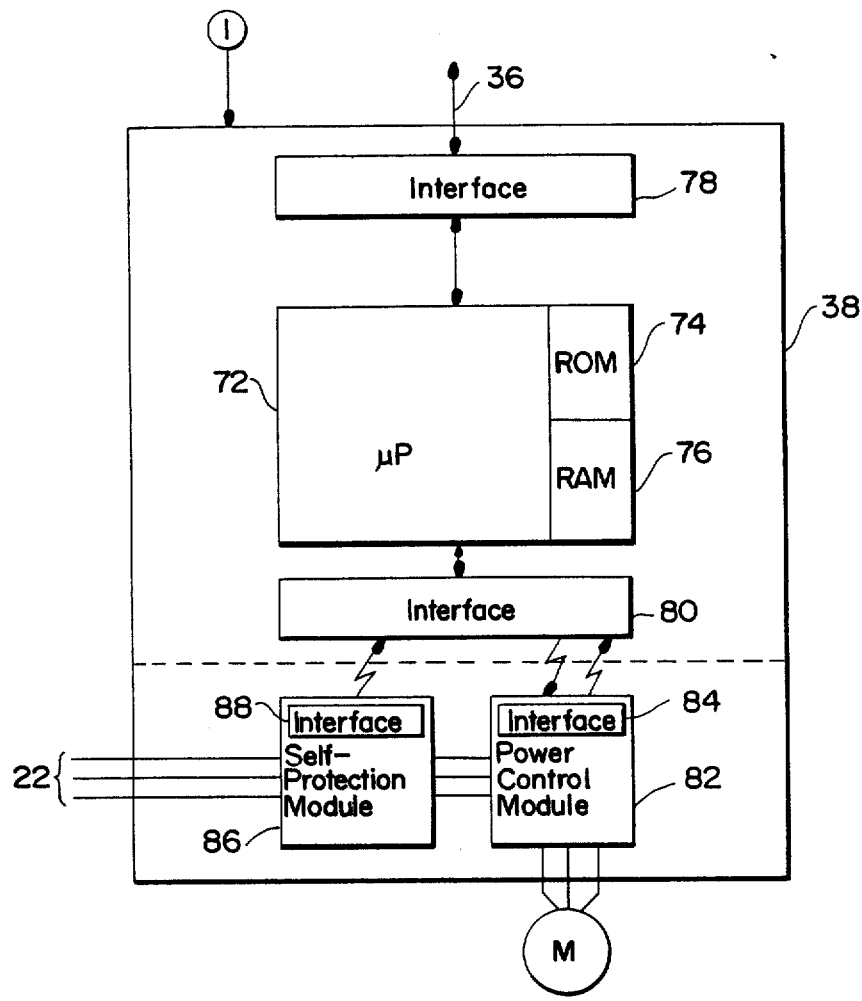

FIG. 4 illustrates in greater detail a motor channel unit 38. Like each channel unit, it comprises a microprocessor 72 and the associated read-only memory 74 and random access memory 76, and an interface 78 designed to connect it to the internal serial network 36.

The motor channel unit contains all the elements necessary for control and protection of a motor M, including self-protection, in a single physical unit. It is connected to the internal serial network 36, to the electrical power supply system 22 (380 V three-phase for instance), to the output 1 of the power supply device 44 supplying voltage to all the electronic circuitry internal to the unit (the internal connections are not shown in order not to complicate the figure unnecessarily, since they are of a conventional type) and finally to the motor M by a wire-to-wire connection.

According to the preferred embodiment of a motor channel unit 38, represented in the figure, the latter is composed of three interconnected modules. The first module, or processing module, comprises the microprocessor 72, the memories 74 and 76, the interface 78, and an interface 80.

A second module 82, comprising an interface 84 which connects it to the interface 80, constitutes a power control and measurement module directly connected to the motor M by a wire-to-wire connection.

A third module 86, comprising an interface 88 which connects it to the interface 80, constitutes a reflex selfprotection module, connected by wire-to-wire connections (one per phase) on the one hand to the electrical power supply system 22 and on the other hand to the power control and measurement module 82.

In the module 82, the control functions of the motor M are performed by conventional static contactors with their control circuitry. These contactors are, for example, constituted by hybrid thyristor circuits with the associated control circuitry. The current and voltage measurement functions in each of the phases are performed in the same module, by conventional means (current transformers on each phase for current measurement for example), the results of these measurements being transmitted by the interfaces 84 and 80 to the microprocessor 72 of the processing module of the unit 38 which performs the motor protection functions. The module 82 preferably performs its own protection (self-protection) against overvoltages. The bidirectional link between the interfaces 84 and 80 is, for example, an optic link by means of photo-couplers, so as to ensure galvanic isolation between the processing module and the control module.

The module 86 provides the short-circuit protection of the control module 82 and of the motor and is preferably constituted by an electromechanical-type circuit breaker device having a fast response time (reflex).

The interface 88 of the self-protection module 86 transmits the information corresponding to the position of the self-protection device signalling contacts to the interface 80. As previously, galvanic isolation between the interfaces is provided. In the case where the module 86 is constituted by an electromechanical circuit breaker, the link is not an optic link, but is achieved by means of microswitches.

The use of two separate modules, 86 and 82, for the self-protection function on the one hand and the power control and measurement functions on the other hand, enables the motor channel unit to be adapted to the required rating within a range, by replacing one of the modules only. Thus, for instance, the same power control module can be used in conjunction with circuit breakers (self-protection module) of different ratings. Similarly, the modularity of the system can be extended by separating the module 82 into two modules, a power control module on the one hand, and a measurement module on the other hand. In the opposite manner, the modules 82 and 86 can be combined to form a single module, without departing from the spirit of the invention.

The interface 80 comprises, in addition to the conventional interfacing circuits proper, processing and shaping circuits of the signals transmitted to it by the module 82, notably measured current rectifier and filter circuits and analog-to-digital conversion circuits. In practice, most of the electronic processing circuitry supplied by the same voltage (5 V) as the processing module will be incorporated in the latter, in the interface 80, in preference to the power control and measurement module 82, in order to reduce as far as possible the influence of interference on these processing circuits, due notably to the power semiconductors which constitute the static contactors.

It should be noted that most of the motor channel actuators and sensors are incorporated in the motor channel unit, thus reducing the wiring with the process to a minimum, namely three connecting wires to the motor.

The motor channel unit microprocessor 72 comprises a specialized motor control and protection program in its read-only memory (ROM) 74. The parameters enabling the motor channel unit to be individualized, which are provided by the parameter memory 66 of the connecting unit 34, are supplied to the random access memory (RAM) 76 of the microprocessor 72 of the unit 38 via the internal serial network 36, each time the assembly is powered on. The motor control orders transmitted from the programmable controler 12, via the internal serial network 36, to the microprocessor 72 are processed by the latter, which supervises the execution of these orders by the control devices of the control and power module 82. In the case of progressive control of the motor, it is also the microprocessor 72 of the unit 38, accordingly preprogrammed, which manages the lock-loops necessary for this control. Similarly, motor speed regulation can be achieved. The microprocessor also monitors correct execution of the control orders and transmits the corresponding information or reports to the monitoring unit 14, via the internal serial network 36, the connecting unit 34 and the monitoring network 18. In addition, the microprocessor 72 of the motor channel unit 38 performs motor protection functions from current and voltage measurements supplied to it by the module 82.

In all cases, the motor channel unit microprocessor provides thermol protection of the line and motor. It can, in addition, be preprogrammed to provide protections against blocked rotor, no-load operation, phase missing, phase reversal, too long start-up, and so on. As is the case above for the control orders, the microprocessor transmits the necessary information relating to the protection functions it performs and to the self-protection functions performed by the self-protection module 86, to the monitoring network. Thus, the motor channel unit 38 performs both control and protection, including selfprotection, of a motor M from information transmitted to it by the internal serial network 36 and by the interface 80, and communicates to this network the information necessary at a higher hierarchical level for process monitoring, this information then being shaped (in clear) in the connecting unit 34.

Figure 5:
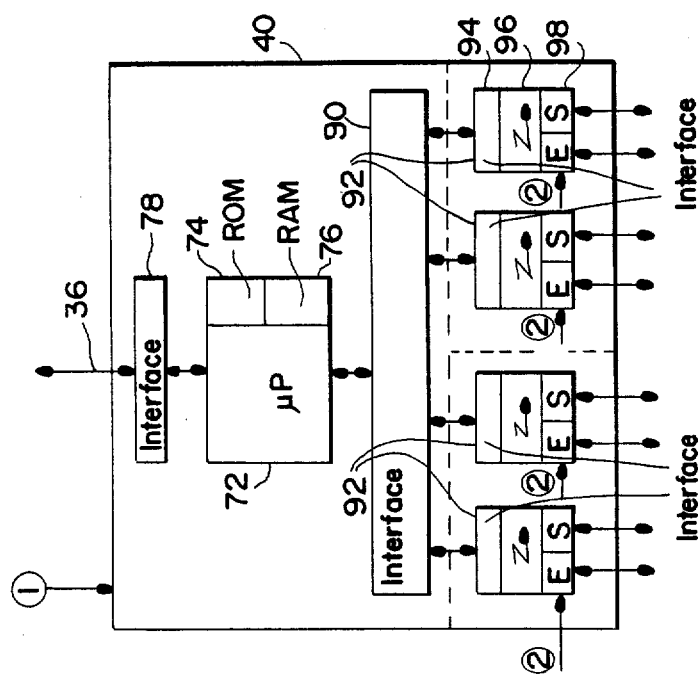

A jack channel control and protection unit 40 is illustrated in greater detail in FIG. 5. It is made up of a processing module comprising a microprocessor 72 and the associated memories 74, 76, a connecting interface 78 to the internal serial network 36 and an interface 90 designed to connect the processing module to several jack group boards 92. In practice, each board 92 is designed to control a group of two jacks and takes the form of a printed circuit, two boards making up a module (outlined by the dotted lines in the figure). A jack channel unit is therefore physically constituted by assembly of a processing module and one or two modules, each module controling four jacks. The unit 40 is connected to the internal serial network 36, to the output 1 of the power supply device 44 for voltage supply to all the electronic circuitry internal to the unit, to the output 2 of the power supply device 44 to supply the jacks with the electrical power they require, and finally to the associated jack unit actuators and sensors by wire-to-wire connections.

Each board 92 is made up of an interface 94 connected to the interface 90 of the processing module of the unit 40 and separated by a galvanic isolation barrier 96 from an interface 98 which is directly connected to the sensors and actuators of the two associated jack channels. The connection between the interfaces 94 and 98 of a board is preferably achieved by means of two photocoupler devices, control and monitoring of each of the jacks associated with a group being performed totally independently from that of the other jack of the same group. Each interface 98 has been schematically represented in the form of an input part E and an output part S, respectively connected wire-to-wire to the associated sensors and actuators. The wire-to-wire connections (2 inputs and 2 outputs per jack) are schematically represented in the form of two connections per interface so as not to overload the figure unnecessarily. Each interface 98 is also connected to the output 2 of the power supply device 44 which constitutes the jack channel unit power input.

The microprocessor 72 of the unit 40 is preprogrammed, so as to perform control of all the jacks associated with the unit. The configuration and parameter setting information necessary for customization of the unit 40 is entered in the random access memory 76, from the parameter memory 66, each time the assembly 20 is powered on. As an example, the information connected with the type of electrodistributor to be controled, whether it is single or multi-coil, that is to say monostable or bistable, forms part of the configuration data transmitted to the random access memory 76, in order to adapt the software contained in the read-only memory 74, which is identical for all types of jacks, to suit the equipment actually used.

The microprocessor 72 of the unit 40, according to the orders transmitted to it by the internal serial network 36, performs control of the jacks, independently from one another and monitors the execution of these orders. To give an example, it checks that opening of the jack has effectively taken place within a preset time interval, for example 1 second, from the time a control order is sent, and then sends a positive or negative report to the monitoring network via the internal network and the connecting unit.

No checking of the compatibility of the orders given by the controler takes place at the level of the assembly 20, whether it be at the level of the connecting unit 34 or at the level of the microprocessors 72 of the channel units. The control order sequence of the various process actuators is determined at the level of the programmable controler 12 only, the assembly 20 merely transmitting and executing these orders. To give an example, no checking of the compatibility of the orders sent to two jacks controled by the jack channel unit 40 is performed at the level of the microprocessor 72 of this unit.

Each interface 98 is self-protected, that is to say the inputs are protected against overvoltages, whereas the outputs are protected against short-circuits, this self-protection being achieved, in a state-of-the-art manner, as close as possible to the sensors or the actuators, i.e. at the level of the interface 98 itself. Any information concerning a failure is naturally transmitted to the microprocessor 72 of the jack channel unit 40, which sends a message to the monitoring network.

Figure 6:
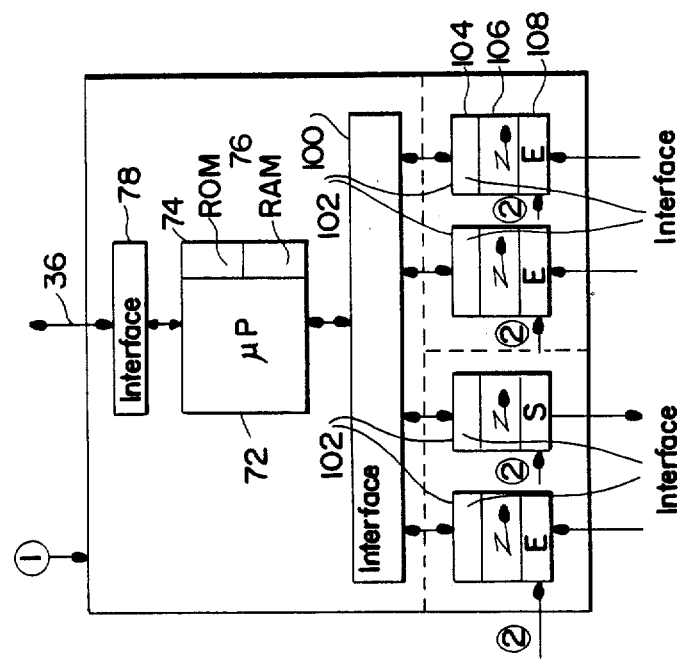

The structure of a binary inputs-outputs unit 42, represented in greater detail in FIG. 6, is comparable with that of the jack channel unit. It is made up by assembly of a processing module comprising a microprocessor 72 and the associated memories 74, 76, a connecting interface 78 to the internal serial network 36 and an interface 100 designed to connect the processing module to several groups 102 of binary inputs-outputs.

In practice, each group comprises two or four inputs or two or four outputs and two groups are combined to form a module (outlined by dotted lines in the figure) whose capacity is four or eight inputs-outputs. As represented in the figure, whereas a group 102 comprises only inputs E or outputs S, a module can be achieved by a combination of inputs and outputs. A channel unit 42 is constituted by assembly of a processing module and one or two inputs-outputs modules, thus being able to monitor a maximum of sixteen inputs-outputs. This configuration is quite clearly given as a non-limiting example only.

The unit 42 is connected to the internal serial network 36, to the output 1 of the power supply device 44 for voltage supply to all the electronic circuitry internal to the unit, to the output 2 of the power supply device 44 to supply to the sensors and actuators associated with it the electrical power they require, and finally to the actuators and sensors (end-of-travel contacts, pass-by detectors, microswitches, etc . . . ) by wire-to-wire connections. In order to avoid overloading the figure, these connections are represented schematically in the figure.

Each group of inputs-outputs 102 is made up of an interface 104 connected to the interface 100 of the processing module of the unit 42 and separated by a galvanic isolation barrier 106 from an interface 108 which is directly connected to the associated sensors and actuators and which is self-protected in a state-of-the-art manner. The interface 108 of a group of inputs provides self-protection of the group against overvoltages and detects breaks and short-circuits on the conductors connecting the interface 108 with the associated sensors and actuators. This information is of course transmitted to the microprocessor 72 which reports it to the monitoring network. In the case of a group of outputs, the interface 108 provides self-protection of the group against short-circuits. As in the case of a jack group board, the connection between the interfaces 104 and 108 and an inputs-outputs group is preferably accomplished by an optic link, by means of photocouplers.

The microprocessor 72 of the unit 42 is preprogrammed so as to perform monitoring of the inputs and outputs and the configuration and parameter setting information is supplied to its memory 76, each time the assembly 20 is powered on. The set of inputs is processed independently from the set of outputs by the microprocessor.

From the examples of channel units represented in FIGS. 4 to 6, a specialist in the art will be able to achieve other types of channel units, by analogy, whether it be speed control interface channel units, analog inputs-outputs channel units, spindle control channel units, etc.

We claim:

1. A control and protection assembly forming part of an automated industrial process control and monitoring system comprising at least one programmable controller having an output connected to a field network of a local area communication network, said system comprising a monitoring unit connected by a bidirectional link to the programmable controller which it monitors, said monitoring unit being further connected to a monitoring network of the local area communication network, the assembly comprising:

connection terminals to the field network and to the monitoring network;

a connection terminal to an electrical power supply system;

a configuration and parameter setting input terminal for connection to a console comprising a keyboard and a display device;

a power supply device connected to the electrical power supply system connection terminal;

a microprocessor-based connecting unit comprising first and second microprocessors, the first microprocessor being connected to the field network and to an internal serial network and the second microprocessor being connected to the monitoring network and to the configuration and parameter setting input terminal, a random access memory common to both microprocessors enabling data to be exchanged between the two microprocessors, said connecting unit comprising an input connected to a first output of the power supply device to provide a voltage supply to electronic components of the connecting unit; and specialized channel units, the outputs of each channel unit being directly connected, by wire-to-wire connections, to process actuators and sensors associated with one or more channels of a single predetermined type, each channel unit comprising an input connected to the internal serial network, a power input connected to the electrical power supply system, either directly or via the power supply device, and an input connected to the first output of the power supply device to provide a voltage supply to the electronic components of the channel unit, each channel unit further comprising a microprocessor preprogrammed so as to perform control and protection of the channels of said predetermined type which are associated with it according to control orders transmitted to said channel unit microprocessor via the local area communication network, and to transmit the information required for monitoring the channels to the local area communication network via the connecting unit and the internal serial network.

2. The assembly according to claim 1, wherein the connecting unit comprises a parameter random access memory connected to a battery and to the second microprocessor of the connecting unit.

3. A control and protection assembly forming part of an automated industrial process control and monitoring system comprising at least one programmable controller whose output is connected to a local area communication network, the assembly comprising:

a connection terminal to the local area communication network;

a connection terminal to an electrical power supply system;

a configuration and parameter setting input terminal for connection to a console comprising a keyboard and a display device;

a power supply device connected to the electrical power supply system connection terminal;

a microprocessor-based connecting unit comprising a first input connected to the local area communication network connection terminal, a second input connected to the configuration and parameter setting input terminal, a third input connected to a first output of the power supply device to provide a voltage supply to electronic components of the connecting unit, the connecting unit output being connected to an internal serial network;

specialized channel units, the outputs of each channel unit being directly connected, by wire-to wire connections, to process actuators and sensors associated with one or channels of a single predetermined type, each channel unit comprising an input connected to the internal serial network, a power input connected to the electrical power supply system, either directly or via the power supply device, and an input connected to the first output of the power supply device to provide a voltage supply to electronic components of the channel unit, each channel unit further comprising a microprocessor preprogrammed so as to perform control and protection of the channels of said predetermined type which are associated with it according to control orders transmitted to said channel unit microprocessor via the local area communication network, the connecting unit and the internal serial network, and to transmit the information required for monitoring the channels to the local area communication network via the connecting unit and the internal serial network;

said specialized channel units comprising at least a motor channel unit including a microprocessor-based processing module connected by a first interface to the internal serial network, and by a second interface to a power control and measurement module and to a self-protection module, the self-protection module providing protection of the motor channel unit in the event of a short-circuit, being connected wire-to-wire to the electrical power supply system and to the power control and measurement module, said power control and measurement module connected wire-to-wire to a motor performing the functions of motor control and current and voltage measurement in each line of the motor power supply circuit, the motor channel unit microprocessor being preprogrammed so as to perform motor control from control orders transmitted to it by the internal serial network, motor protection according to information supplied to it by the power control and measurement module measuring devices, and to transmit information from the self-protection and power control and measurement modules, necessary for monitoring the motor channel, to the internal serial network.

4. A control and protection assembly forming part of an automated industrial process control and monitoring system comprising at least one programmable controller whose output is connected to a local area communication network, the assembly comprising:

a connection terminal to the local area communication network;

a connection terminal too an electrical power supply system;

a configuration and parameter setting input terminal for connection to a console comprising a keyboard and a display device;

a power supply device connected to the electrical power supply system connection terminal;

a microprocessor-based connecting unit comprising a first input connected to the local area communication network connection terminal, a second input connected to the configuration and parameter setting input terminal, a third input connected too a first output of the power supply device to provide a voltage supply to electronic components of the connecting unit, the connecting unit output being connected to an internal serial network;

specialized channel units, the outputs of each channel unit being directly connected, by wire-to-wire connections, to process actuators and sensors associated with one or more channels of a single predetermined type, each channel unit comprising an input connected to the internal serial network, a power input connected to the electrical power supply system, either directly or via the power supply device, and an input connected to the first output of the power supply device to provide a voltage supply too electronic components of the channel unit, each channel unit further comprising a microprocessor preprogrammed so as to perform control and protection of the channels of said predetermined type which are associated with it according to control orders transmitted to said channel unit microprocessor via the local area communication network, the connecting unit and the internal serial network, and to transmit the information required from monitoring the channels to the local area communication network via the connecting unit and the internal serial network;

said specialized units comprising at least a jack channel unit comprising a processing module, including a microprocessor, connected by a first interface to the internal serial network and by a second interface to self-protected jack group boards, each board being connected to a second output of the power supply device and connected wire-to-wire to the actuators and contactors of the associated jack channels, said microprocessor being preprogrammed to perform control and monitoring of the jacks associated with the unit and comprising a random access memory designed to receive, via the connecting unit, information coming from the console necessary for configuration and parameter setting of the unit.

* * * * *